United States Patent
Baeumges et al.

(10) Patent No.: US 8,762,378 B2
(45) Date of Patent: Jun. 24, 2014

(54) INDEPENDENT TABLE NODES IN PARALLELIZED DATABASE ENVIRONMENTS

(75) Inventors: Daniel Baeumges, Viersen (DE); Lars Fricke, Worms (DE); Christian Hensberg, Heidelberg (DE)

(73) Assignee: SAP AG, Walldorf (DE)

( * ) Notice: Subject to any disclaimer, the term of this patent is extended or adjusted under 35 U.S.C. 154(b) by 173 days.

(21) Appl. No.: 13/336,921

(22) Filed: Dec. 23, 2011

(65) Prior Publication Data

US 2013/0166556 A1 Jun. 27, 2013

(51) Int. Cl.
*G06F 17/30* (2006.01)

(52) U.S. Cl.
USPC .............. 707/737; 707/770; 707/782

(58) Field of Classification Search
None
See application file for complete search history.

(56) References Cited

U.S. PATENT DOCUMENTS

| | | | |
|---|---|---|---|
| 6,581,075 B1 * | 6/2003 | Guturu et al. | 1/1 |
| 6,754,681 B2 * | 6/2004 | Brodersen et al. | 1/1 |
| 6,772,163 B1 * | 8/2004 | Sinclair et al. | 1/1 |
| 6,775,673 B2 * | 8/2004 | Mahalingam et al. | 1/1 |
| 7,779,045 B2 * | 8/2010 | Mohamed et al. | 707/802 |
| 8,051,032 B2 * | 11/2011 | Cooper et al. | 707/602 |
| 8,151,062 B2 * | 4/2012 | Krishnaprasad et al. | 711/143 |
| 8,554,762 B1 * | 10/2013 | O'Neill et al. | 707/715 |
| 8,595,268 B2 * | 11/2013 | Shoolman et al. | 707/803 |
| 2005/0187977 A1 * | 8/2005 | Frost | 707/104.1 |
| 2013/0151491 A1 * | 6/2013 | Gislason | 707/696 |

* cited by examiner

*Primary Examiner* — Fred I Ehichioya
*Assistant Examiner* — Michelle Owyang
(74) *Attorney, Agent, or Firm* — Mintz Levin Cohn Ferris Glovsky and Popeo, P.C.

(57) ABSTRACT

A recipient node of a multi-node data partitioning landscape can receive, directly from a requesting machine without being handled by a master node, a first data request related to a table. A target node of a plurality of processing nodes can be identified to handle the data request. The determining can include the recipient node applying partitioning information to determine a target data partition of the plurality of data partitions to which the data request should be directed and mapping information associating each data partition of the plurality of data partitions with an assigned node of the plurality of processing nodes. The recipient node can redirect the data request to the target node so that the target node can act on the target data partition in response to the data request.

14 Claims, 10 Drawing Sheets

INDEPENDENT TABLE NODES IN PARALLELIZED DATABASE ENVIRONMENTS

TECHNICAL FIELD

The subject matter described herein relates to partitioning of at least one of data storage and data processing demands, for example between more than one server in a multi-server, parallel processing database management system.

BACKGROUND

In recent years, central processing units (CPUs) of computer processing hardware have generally experienced their greatest performance increases by increasing the number of processor cores rather than through increasing clock rates. Accordingly, to maximize performance, modern software advantageously employs the benefits of multi-core CPUs by allowing parallel execution and with architectures that scale well with the number of cores. For data management systems, taking full advantage of parallel processing capabilities generally requires partitioning of stored data into sections or "partitions" for which the calculations can be executed in parallel.

A database program or database management system generally displays data as two-dimensional tables, of columns and rows. However, data are typically stored as one-dimensional strings. A row-based store typically serializes the values in a row together, then the values in the next row, and so on, while a column-based store serializes the values of a column together, then the values of the next column, and so on.

In general, column-based systems are more efficient when an aggregate needs to be computed over many rows but only for a notably smaller subset of all columns of data, because reading that smaller subset of data can be faster than reading all data. Column-based systems can be more efficient when new values of a column are supplied for all rows at once, because that column data can be written efficiently and replace old column data without touching any other columns for the rows. Row-based systems can be more efficient when many columns of a single row are required at the same time, and when row-size is relatively small, as the entire row can be retrieved with a single disk seek. Row-based systems can also be more efficient when writing a new row if all of the column data is supplied at the same time, as the entire row can be written with a single disk seek.

Column-based storage can facilitate execution of operations in parallel using multiple processor cores. In a column store, data are already vertically partitioned, so operations on different columns can readily be processed in parallel. If multiple columns need to be searched or aggregated, each of these operations can be assigned to a different processor core. In addition, operations on one column can be parallelized by partitioning the column into multiple sections that are processed by different processor cores. Column data is typically of uniform type, which can facilitate opportunities for storage size optimizations available in column-based data stores that are not available in row-based data stores. For example, some modern compression schemes can make use of the similarity of adjacent data to compress. To improve compression of column-based data, typical approaches involve sorting the rows. For example, using bitmap indexes, sorting can often improve compression by approximately an order of magnitude. In conventional systems, columnar compression generally achieves a reduction in storage space requirements at the expense of efficiency of retrieval. Retrieving all data from a single row can be more efficient when that data is located in a single location, such as in a row-based architecture. Further, the greater adjacent compression achieved, the more difficult random-access may become, as data typically need to be uncompressed to be read. Therefore, conventional column-based architectures are often enriched by additional mechanisms aimed at minimizing the need for access to compressed data. These additional mechanisms can result in lower compression efficiency and/or increased processing requirements to access the compressed data.

Currently available relational database management systems can accomplish partitioning based on specified criteria applied to split the database. In general, a partitioning key is used to assign a partition based on certain criteria. Commonly used approaches include range partitioning, list partitioning, hash partitioning, round robin partitioning, and composite partitioning. In range partitioning, a partition can be defined by determining if the partitioning key is inside a certain range. For example, a partition can be created to include for all rows in which values in a column of postal codes are between 70000 and 79999. In list partitioning, a partition can be assigned a list of values and the partition can be chosen if the partitioning key has one of the values on the list. For example, a partition built to include data relating to Nordic countries can includes all rows in which a column of country names includes the text string values Iceland, Norway, Sweden, Finland, Denmark, etc. In hash partitioning, the value of a hash function can determine membership in a partition. For example, for a partitioning scheme in which there are four partitions, the hash function can return a value from 0 to 3 to designate one of the four partitions. Round robin partitioning can be used to distribute storage and/or processing loads among multiple data partitions and/or servers or server processes according to a pre-set rotation among the available partitions or servers or server processes. As an example, a first data unit can be directed to a first partition of three partitions, a second data unit to the second partition, a third data unit to the third partition, a fourth data unit to the first partition, and so forth. In composite partitioning, certain combinations of other partitioning schemes can be allowed, for example by first applying a range partitioning and then a hash partitioning.

SUMMARY

In one aspect, a recipient node of a multi-node data partitioning landscape receiving a first data request related to a table directly from a requesting machine without being handled by a master node. The multi-node data partitioning landscape includes a plurality of processing nodes, each including at least one data partition of a plurality of data partitions. The recipient node identifies a target node of the plurality of processing nodes to handle the data request. The determining includes the recipient node applying partitioning information to determine a target data partition of the plurality of data partitions to which the data request should be directed and mapping information associating each data partition of the plurality of data partitions with an assigned node of the plurality of processing nodes. The recipient node, redirects the data request to the target node so that the target node can act on the target data partition in response to the data request.

In some variations, one or more of the following features can optionally be included in any feasible combination. The partitioning information and the mapping information can optionally be accessed from at least one of a local storage accessible to the recipient node and a metadata repository accessible to each of the plurality of processing nodes. The plurality of data partitions can optionally be part of a multi-node data partitioning landscape that optionally includes data partitioning over at least two partitioning levels. The table can optionally be partitioned at a first level using a first partitioning specification and at a second level using a second partitioning specification. The table can optionally be partitioned at a first level into at least two first level partitions based on a first partitioning method. Each of the first level partitions can optionally be further partitioned at a second level into two or more second-level partitions based on a second partitioning method that can optionally be the same for all of the at least two first level partitions. The method can optionally further include determining that at least one of the plurality of data partitions requires splitting, performing a split of each of the plurality of data partitions according to a partitioning specification to form a second plurality of second-level partitions, and updating the partitioning information and the mapping information for the recipient node and all other processing nodes of the plurality of processing nodes such that each processing node of the plurality of processing nodes is capable of acting as the recipient node. The data request can optionally include an update of a record already on the target data partition and the method can optionally further include copying the record to a temporary partition on the target processing node, deleting the record from the target data partition, updating the record according to the data request to include an updated value, moving the updated record to a revised target partition based on the partitioning information applied to at least part of the updated value, and deleting the record from the temporary partition. If the plurality of data partitions is according to range partitioning, and if the data request includes a creation of a new record that does not fit within a range assigned to any of the plurality of data partitions, the method can optionally further include assigning a rest partition as the target data partition.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

One or more implementations of the current subject matter can, among other possible advantages, include the use of independent index nodes. In this approach, which can optionally be used in conjunction with a multi-level partitioning approach such as is also described herein, each server or data server process (e.g. each node) in a multi-server system with data partitioning can manage itself as well as the partitioning of data between the data server processes.

Figure 1:
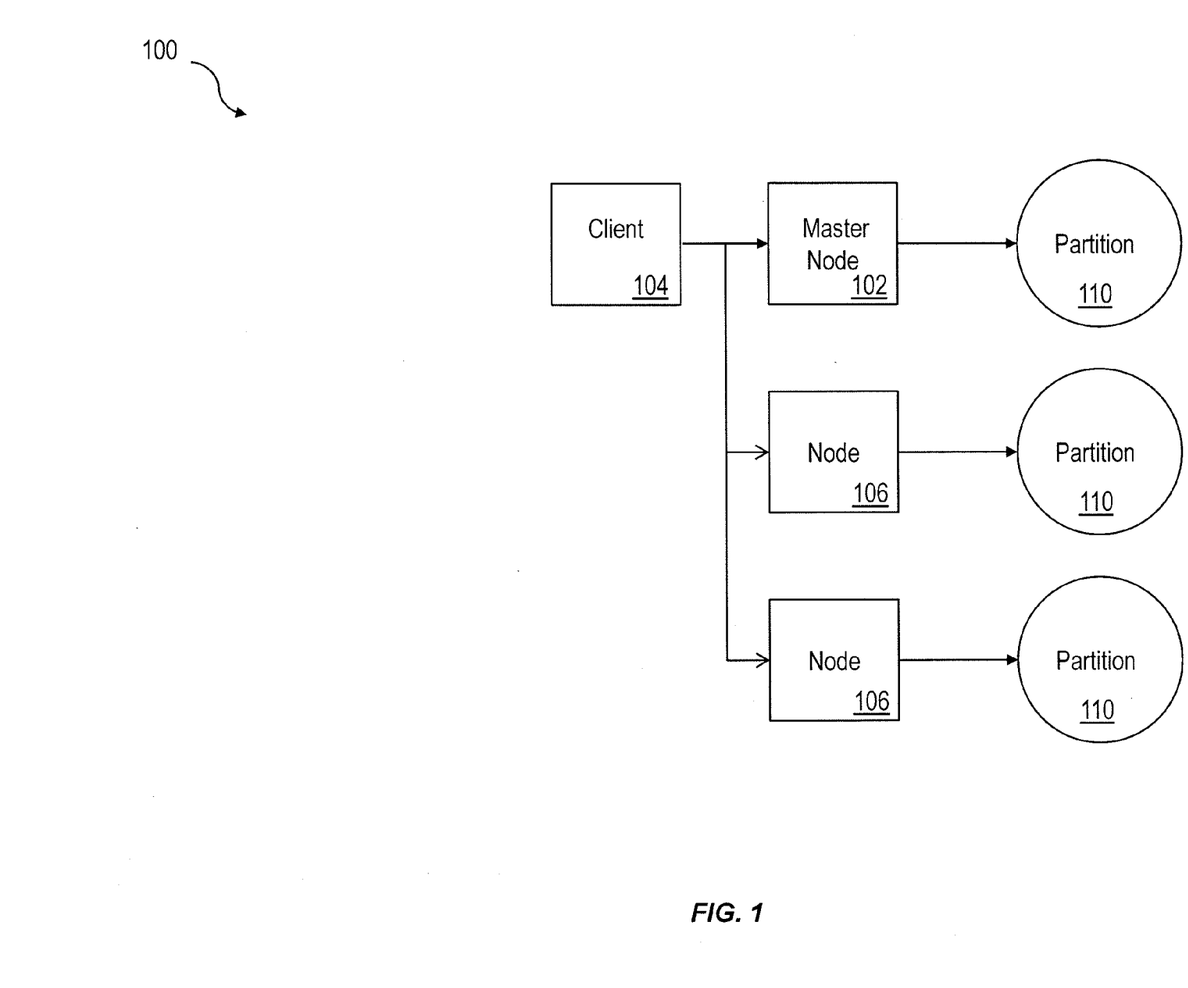
FIG. 1 is a diagram illustrating features of a conventional partitioning approach.

FIG. 1 shows an example of a first data partitioning landscape 100 illustrating a conventional approach to handling of data partitioned among multiple nodes in a multi-node system. A master node 102 can receive data, a request for data or for data processing, or the like, for example from a client machine 104 as shown in FIG. 1, a data provider, a data consumer, or the like. The master node 102 distributes the data or the requests for data to two or more slave nodes 106. Each of the slave nodes 106 includes a data partition 110 of the overall data store, and each slave node 106 communicates with the master node 102 to carry out operations on data retained in its assigned data partition 110. In some cases, the client 104, etc. can communicate directly with a specific slave node 106 while bypassing the master node 102, for example via a remote function call (RFC) server or node (not shown), which retains a mapping of data partitions among the slave nodes 106 and effectively performs one or more of the functions of the master node 102.

Figure 2:
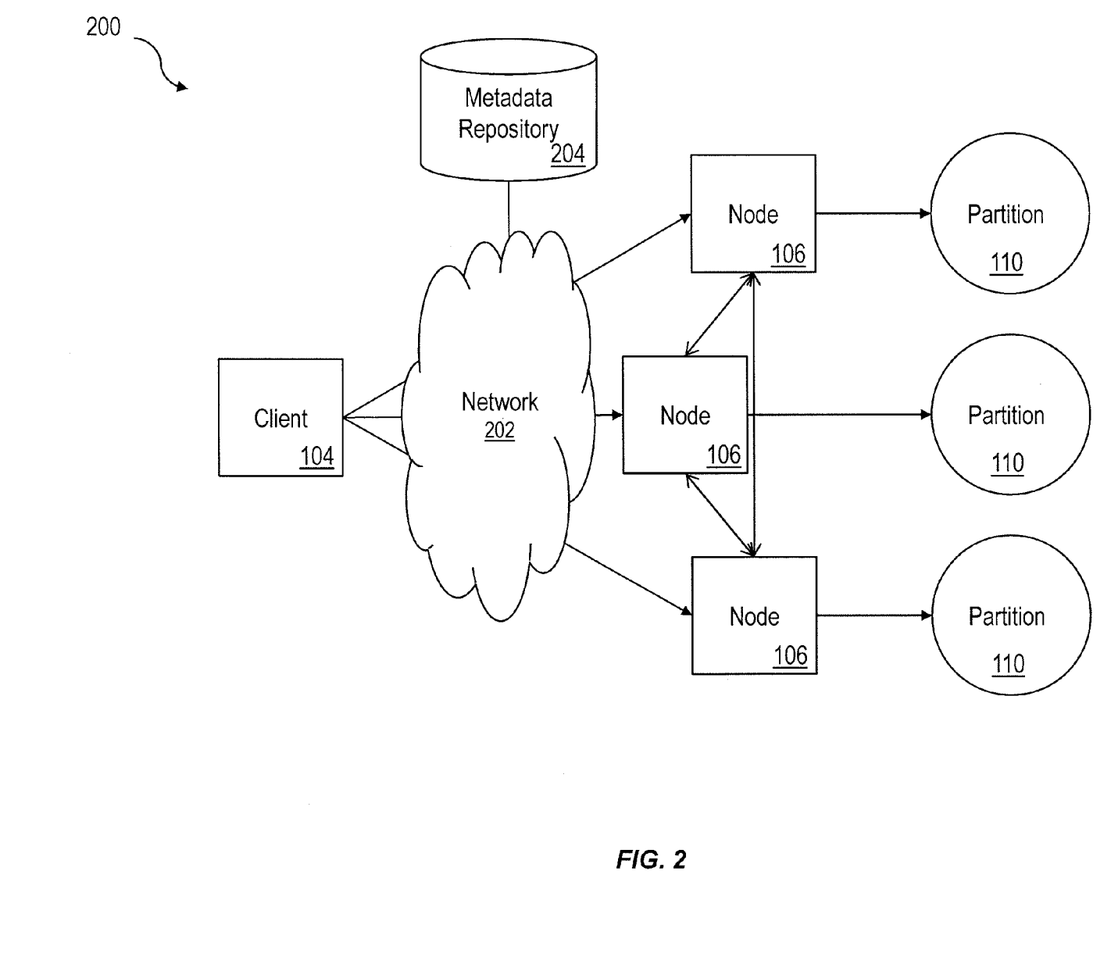
FIG. 2 is a diagram illustrating features of a independent index node partitioning approach consistent with at least some implementations of the current subject matter.

FIG. 2 shows an example of a multi-node data partitioning landscape 200 illustrating an improved approach to handling of data partitioned among multiple nodes in a multi-node system. As shown in FIG. 2, a client 104 can communicate with a receiving node, which can be any of a plurality of parallel nodes 106 that each handles at least one of a plurality of data partitions 110. The communication between the client 104 and the receiving node of the plurality of nodes 106 can be via a direct connection or over a network 202 as is shown in FIG. 2. Upon receiving data, a request for data or for data processing, or the like (hereinafter referred to generically as a request) from a client machine 104, a data provider, a data consumer, or the like, the receiving node of the multiple nodes 106 examines the request and determines how the request must be directed to the available nodes based on the data partitioning in the data partitions 110. The receiving node 106 then distributes the request to the other nodes 106 as necessary. The client 104 can communicate with any one of the nodes 106 or with more than one or with all of the nodes 202. A metadata repository 204 or other passive resource storing metadata or other mapping data, rules, attributes, the partitioning specification or criteria, etc. can be accessible to one or more of the client 104 and the plurality of nodes 106. The metadata repository 204 can be accessible via the network 202, as shown in FIG. 2, or via one or more of the plurality of nodes 106 or by the client 104 via a dedicated or shared connection.

In one variation, the client 104 can be provided with a partitioning specification or criteria in advance of the request, such as for example hash functions, ranges, or other information necessary to direct the request to an appropriate one or more of the nodes 106. In such a case, the receiving node or nodes 106 can also perform a check of the request to ensure that the request or part of the request received by the receiving node is directed properly. In some variations, round robin partitioning can be used. For example, hash values and ranges need not be part of the partitioning plan. Rather, distribution of data storage among the data partitions 110 of the multiple nodes 106 can be controlled by the client 104 itself (optionally via contact with the metadata repository 204 or other resource), which can be tasked to send at least approximately the same volume of data to each of the multiple nodes 106. In this example, the client 104 can perform load balancing functions to at least approximately equalize the amount of data stored on each of the multiple nodes 106.

Figure 3:
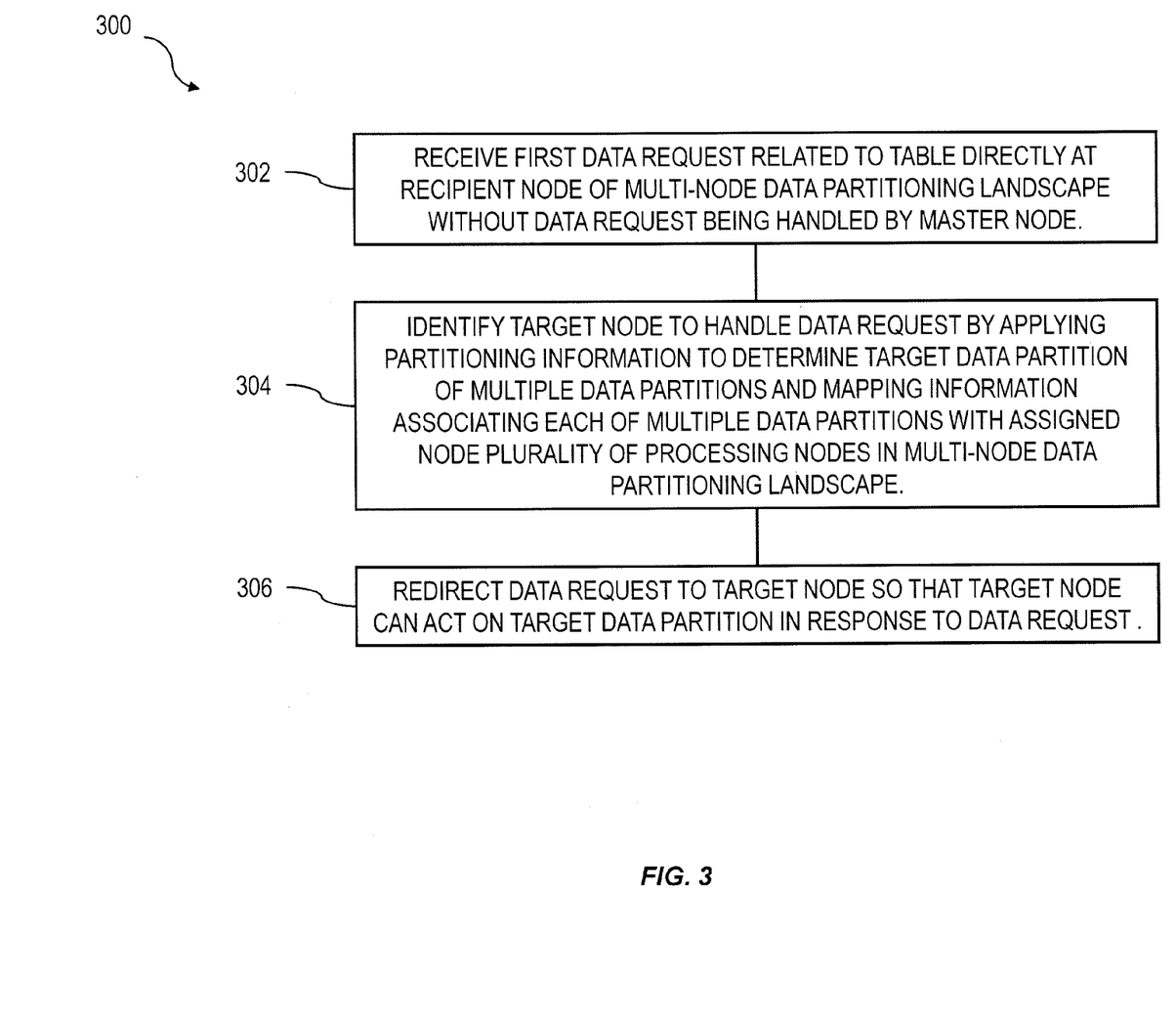
FIG. 3 is a process flow diagram illustrating aspects of a method having one or more features consistent with at least some implementations of the current subject matter.

FIG. 3 shows a process flow chart 300 illustrating method features, one or more of which can be included in implementations of the current subject matter. At 302, a recipient node of a multi-node data partitioning landscape directly receives a first data request related to a table. The data request is received directly from a requesting machine without being handled by a master node. The recipient node is one of a plurality of processing nodes, which can be physical servers each including one or more programmable processors, server processes (e.g. virtual machines spread across one or more physical machines), a combination of physical and virtual processors, or the like. Each of the plurality of processing nodes can optionally include at least one data partition, although it is not necessary that the recipient node actually has a partition of its own. The data request can include at least one of creation of a new record, a retrieval of a record already on the target data partition, an update of the record already on the target data partition, and a deletion of the record already on the target data partition.

At 304, the recipient node identifies a target node of the plurality of processing nodes to handle the data request. The determining can include the recipient node applying partitioning information to determine a target data partition of the plurality of data partitions to which the data request should be directed and mapping information associating each data partition of the plurality of data partitions with an assigned node of the plurality of processing nodes. The partitioning information can include, for example, the partitioning specification and/or one or more partitioning criteria to determine to which data partition of the plurality of data partitions a newly created data record should be stored and from which data partition of the plurality of data partitions an existing record can be accesses for retrieval, updating, and/or deletion operations. The partitioning information can optionally be stored either at each individual node or in a metadata repository. The mapping information can include metadata or other mapping data, rules, attributes, etc., which can also optionally be stored either at each individual node or in a metadata repository. At 306, the recipient node redirects the data request to the target node so that the target node can act on the target data partition in response to the data request.

Figure 4:
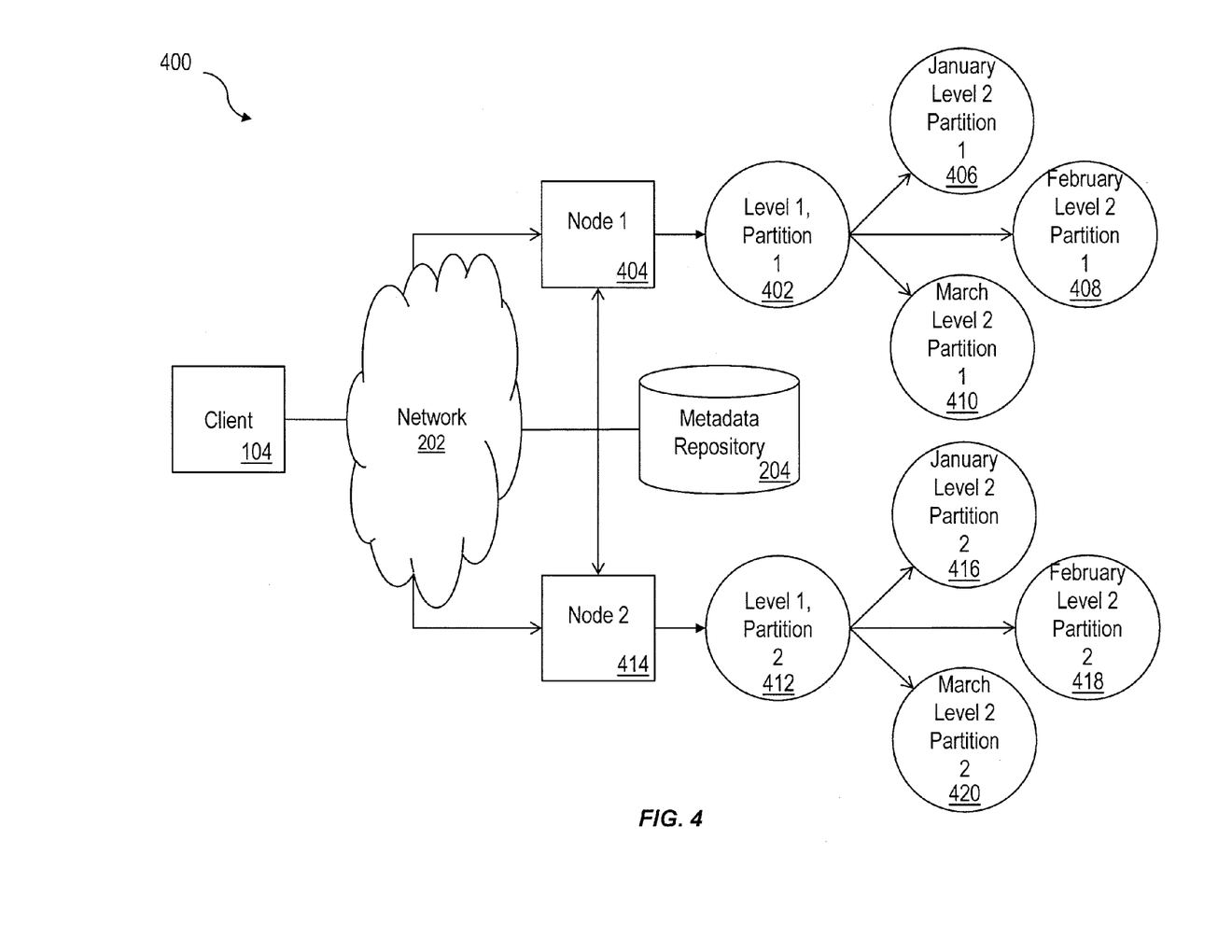
FIG. 4 is a diagram illustrating features of a multi-level partitioning approach consistent with at least some implementations of the current subject matter.

A parallel independent index node such as is described above can advantageously be used in combination with a multi-level partitioning approach such as is illustrated in FIG. 4. As shown in the framework 400 of FIG. 4, a database can be range partitioned into one partition for each month of the first quarter of a year. Accordingly, a level 1 first data partition 402 on a first node 404 is sub-partitioned into a level 2 first January partition 406, a level 2 first February partition, 408, and a level 2 first March partition 410. A level 1 second data partition 412 on a second node 414 is sub-partitioned into a level 2 second January partition 416, a level 2 second February partition, 418, and a level 2 second March partition 420. In the example illustrated in FIG. 4, the partitioning of data on the database between the level 4 first database partition 402 and the level 4 second database partition 412 can be accomplished using a hash partitioning approach in which a hash value is calculated for a data record using a hash function based on values for the data record in one or more columns of the database. FIG. 4 shows two nodes 404, 414 respectively hosting the two level 4 partitions 402, 412, but this simplified depiction is not intended as a limitation. Any number of parallel nodes with associated level 2 data partitions is within the scope of the current subject matter. Additionally, the first level partitioning need not be between two or more nodes but can instead be performed within a single node. Other partitioning methods than those described in reference to FIG. 4 can be used for either or both of the level 1 and level 2 partitioning. Additionally, any number of partitions can be formed at either or both of the partitioning levels. One or more additional partitioning levels can also optionally be used.

FIG. 4 also shows a client 104 communicating with the nodes 404, 414, which can, as discussed above, each be capable of directing data transaction requests (e.g. storage requests, retrieval requests, queries, etc.) to a proper server process that is appropriate to the data transaction request according to the partitioning rules at the first and/or the second or additional partitioning levels. As in FIG. 2, a metadata repository 204 or other passive resource storing metadata or other mapping data, rules, attributes, the partitioning specification or criteria, etc. can be accessible to one or more of the client 104 and the parallel server processes 404, 414. The metadata repository 204 can be accessible via the network 202, as shown in FIG. 4, or via one or more of the parallel server processes 404, 414 or by the client 104 via a dedicated or shared connection. The parallel nodes 404, 414 can communicate, either by direct connection or over the network 202 or some other network connection, to redistribute an incoming data transaction to an appropriate one of the parallel nodes 404, 414 in accordance with the partitioning information. This partitioning information can be stored at the metadata repository 204, or can alternatively be retained at one or more or all of the parallel nodes 404, 414 such that each of the parallel nodes 404, 414 can act as a recipient server and can direct the received data transaction request to an appropriate one of the parallel nodes 404, 414 as needed to respond to the received data transaction request.

The approach depicted in FIG. 4 employs hash partitioning to distribute data among the parallel nodes 404, 414 and range partitioning (e.g. by date ranges) to further distribute data from each of the two or more level 1 partitions 402, 412 into level 2 partitions (e.g. sub-partitions). Implementations using these or other partitioning approaches in a different order are also within the scope of the current subject matter. For example, range partitioning (or some other partitioning approach) can be used at the first level to distribute data among two or more parallel nodes, and hash partitioning (or some other partitioning approach different than the partitioning approach used at the first level) can be used at the second level. Range partitioning can be applied on any data that are amenable to being orders (e.g. postal codes, dates, phone numbers, catalog numbers etc.). The use of date values in range partitioning as discussed herein can be advantageous in certain applications in which the date itself is a query value provided within a query of the database. In this case, the query itself can designate which level 2 partition needs to be searched to reply to the query. In still other implementations, multi-level partitioning can be performed within a single server process or physical server. In this manner, a multi-level partitioning tree structure can create multiple sub-partitions of the data storage with improved parallelism that can improve the efficiency of database operations such as indexing, merging, data retrieval, and the like. One or more of such operations can be further improved via improved by using pruning, in which a partition specification is evaluated and only the partitions that may potentially hold the requested data are considered.

Figures 5A, 5B, 5C:
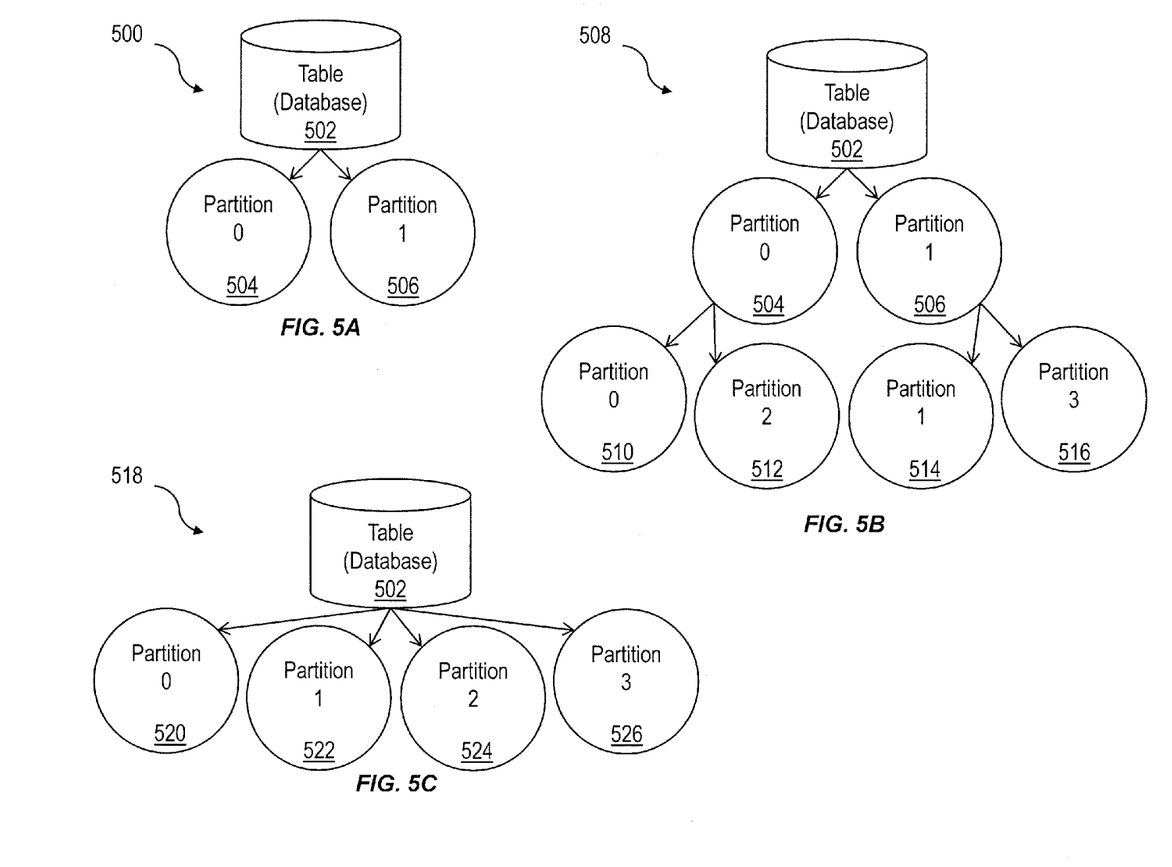
FIG. 5A, FIG. 5B, and FIG. 5C are diagrams illustrating features of a parallel partition re-splitting approach consistent with at least some implementations of the current subject matter.

In some implementations of the current subject matter, a parallel re-split of the index nodes can be performed. Consistent with this aspect, data storage is partitioned at multiple levels, for example at a first level between multiple parallel servers or server processes and at a second level among sub-partitions of the first level partitions as discussed above. FIG. 5A shows a diagram 500 illustrating an example of a parallel partition re-splitting arrangement. In the example of FIG. 5A, a table can be initially partitioned into two first level partitions 502, 504. As the size of the data partitions increases, it can be desirable to re-partition at a second level to create two or more second level partitions from each of the first level partitions. In such an example, particularly if the level 1 partitions 502, 504 are maintained at different nodes of a multi-node data partitioning landscape such as is discussed above, it can be advantageous to be able to perform partition splitting without the need to copy all of the data from the first level partitions to a common node. Implementations of the current subject matter enable this to occur, for example as shown in the diagram 508 of FIG. 5B by performing a parallel re-split of the first and second partitions 504, 506 into a total of 4 partitions by applying a hash 4 operation on both original partitions. The hash 4 operation applies modulo 4 on the values. For partition 0 (504) the modulo operation returns the values/target partitions 0 and 2 (510 and 512). For partition 1 (506) the modulo operation returns the values/target partitions 1 and 3 (514 and 516). The target partitions 510, 512, 514, 516, thereby giving the equivalent of a hash 4 split. A table that is originally split into four partitions using a hash 4 partitioning specification (as opposed to the sequential splits described above) has its resultant four partitions 520, 522, 524, 526 numbered sequentially as shown in the diagram 518 of FIG. 5C. In contrast, the sequential splits shown in FIG. 5B leave the resultant four partitions 510, 512, 514, 516 numbered non-sequentially.

For the partition specification of the multi-node data partitioning landscape to operate correctly, the partitions need to be in proper order. Otherwise, a data request could be directed to an incorrect partition. As such, the independent index nodes can take care of numbering as though the partitioning were originally performed to the full current partitioning. For example, in the case where the original split was between two or more nodes, the addressing of the locations of the partitions resulting after the second sequential split could cause a data request to be misdirected by the independent index nodes acting as recipient nodes. As such, after a parallel re-split of the table indexes as shown in FIG. 5B, the partitioning information and the mapping information must be corrected to reflect the new numbering. In particular, the mapping information can reflect a conversion from the non-sequential partition numbering of FIG. 5B to the sequential numbering of FIG. 5C. This updated conversion information can be stored either at one or more or all of the potential recipient nodes (e.g. all of the nodes in the multi-node data partitioning landscape, in one or more metadata repositories accessible to all of the potential recipient nodes, or the like.

Unlike in a conventional re-partitioning approach, using features consistent with this aspect of the current subject matter, the ordering (e.g. numbering, labeling, etc.) of the partitions can be readily maintained without a need for moving all of the data in the partitions to be reallocated to a same server before the re-splitting can commence. Instead, it is possible to perform partition splits in parallel without moving to a common server. Use of this aspect in conjunction with multi-level partitioning features, for example consistent with those discussed above in reference to FIG. 4, can be advantageous.

Some implementations of the current subject matter can include one or more features relating to updating a value in a column that is split across one or more partition. As shown in the diagram 600 of FIG. 6A, a table 602 can be split across two data partitions 604, 606. A record 610 that is assigned to the first data partition 604 can have a first value. The partitioning specification of the database can include one or more partitioning criteria such as are described elsewhere herein. When an update to the record 610 occurs that changes the first value to a second value, the second value can, based on the one or more partitioning criteria, require that the record 610 be moved to the second data partition. As a simplified example, if the first value is the number 5 and the partitioning specification includes range partitioning with partitioning criteria requiring that values of 5 or less be stored on the first partition 604 while values of greater than 5 be stored on the second partition 606, an update to the second value of the number 6 requires that the record 610 be moved from the first partition 604 to the second partition 606.

Figure 6A:
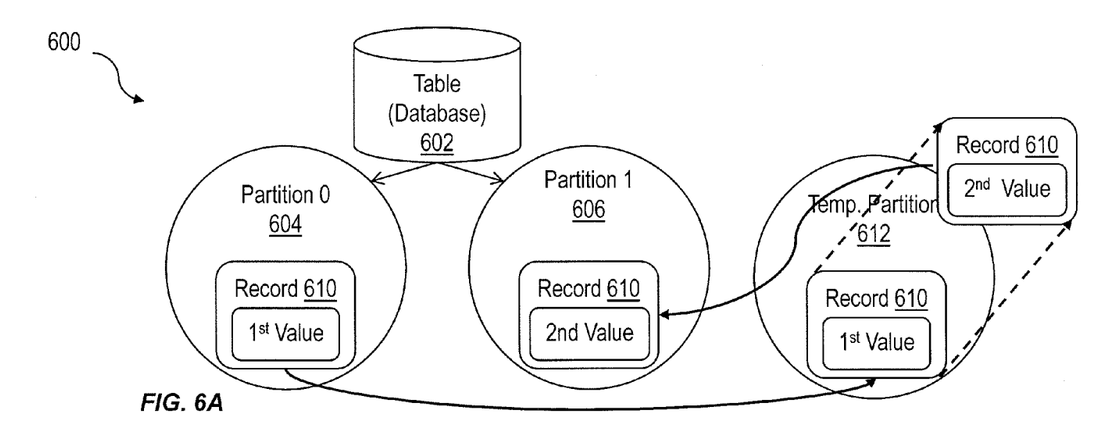
FIG. 6A and FIG. 6B are diagram illustrating features of approach to value updating in partitioned columns consistent with at least some implementations of the current subject matter.

Consistent with one or more implementations of the current subject matter, any index node (server, server process, etc.) of a multi-node data partitioning landscape is capable of receiving a data request (e.g. creation of a new record, retrieval of an existing record, update of an existing record, or deletion of an existing record) and directing that data request to the correct node of the multi-node data partitioning landscape. In the event that the data request pertains to an existing data record that is on a data partition controlled by the receiving node, the receiving node performs the following operations. In the event that the data request pertains to an existing data record on another node of the multi-node data partitioning landscape, the receiving node passes the data request to the other node, for example in a manner as described above. Once the node possessing the necessary data record receives the data request, if the request is an update request (e.g. a change of a value in the record) on a column which is part of the partitioning criteria, it might be required that some records have to be moved to another partition so that all records fulfill the partitioning criteria after the update. The following is illustrated with a single record which is being updated. The record 610 matches the update criteria (e.g. SQL statement "UPDATE SET A=second value WHERE A=first value"). The record 610 is first moved to a temporary partition 612 as shown in FIG. 6A and deleted from the original partition 604. While the record is on the temporary partition, the update operation is performed on the temporary partition. If more than one record is in the temporary partition, all rows can be updated at once. Then, based on the second value, the record is moved to the appropriate new partition based on the partitioning specification and/or one or more partitioning criteria. Finally, the record 610 is deleted from the temporary partition 612. It is possible that a single update call from the client causes that many records of different partitions have to be updated. It is generally necessary that these updates do not interfere with each other. In other words, a record must not be moved to another partition and then updated again as it again matches the WHERE clause of the UPDATE. Instead it is generally necessary to move all records that match the WHERE clause to their respective temporary parts of all relevant partitions. Then, the updates have to be performed on all temporary parts and then distributed to the target parts. In this manner, it can be ensured that an update is only executed once per record.

In the example of FIG. 6A, the change to the second value requires that the record 610 be placed the second partition 606 instead of the first partition 604. In another example, the update to the second value could result in the record 610 being placed back in the first partition 604. It will be readily understood that the two-partition example of FIG. 6A is merely illustrative and that any number of partitions and index nodes can be included. A temporary partition 612 can be provided on each node of the multi-node data partitioning landscape such that moving of a record between nodes occurs only if the update to the value of the record results in a requirement that the record be moved to the new node to conform with the partitioning criteria of the partitioning specification.

Figure 6B:
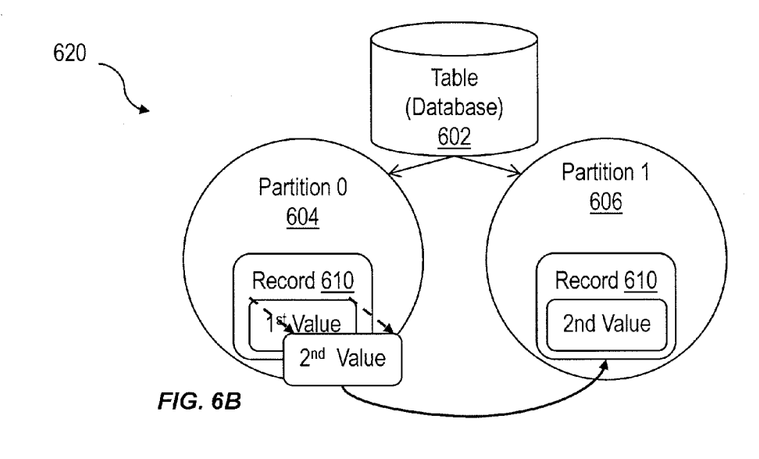

In an alternative implementation, all relevant records can be updated in their original partitions. The update operation can return identifiers of all records that have been updated. Using these record identifiers, the updated rows can be inspected, and if their values do not match the partitioning criteria anymore, the records can be distributed to their new target partitions and removed from their original partition as illustrated in the diagram 620 of FIG. 6B.

Figure 7:
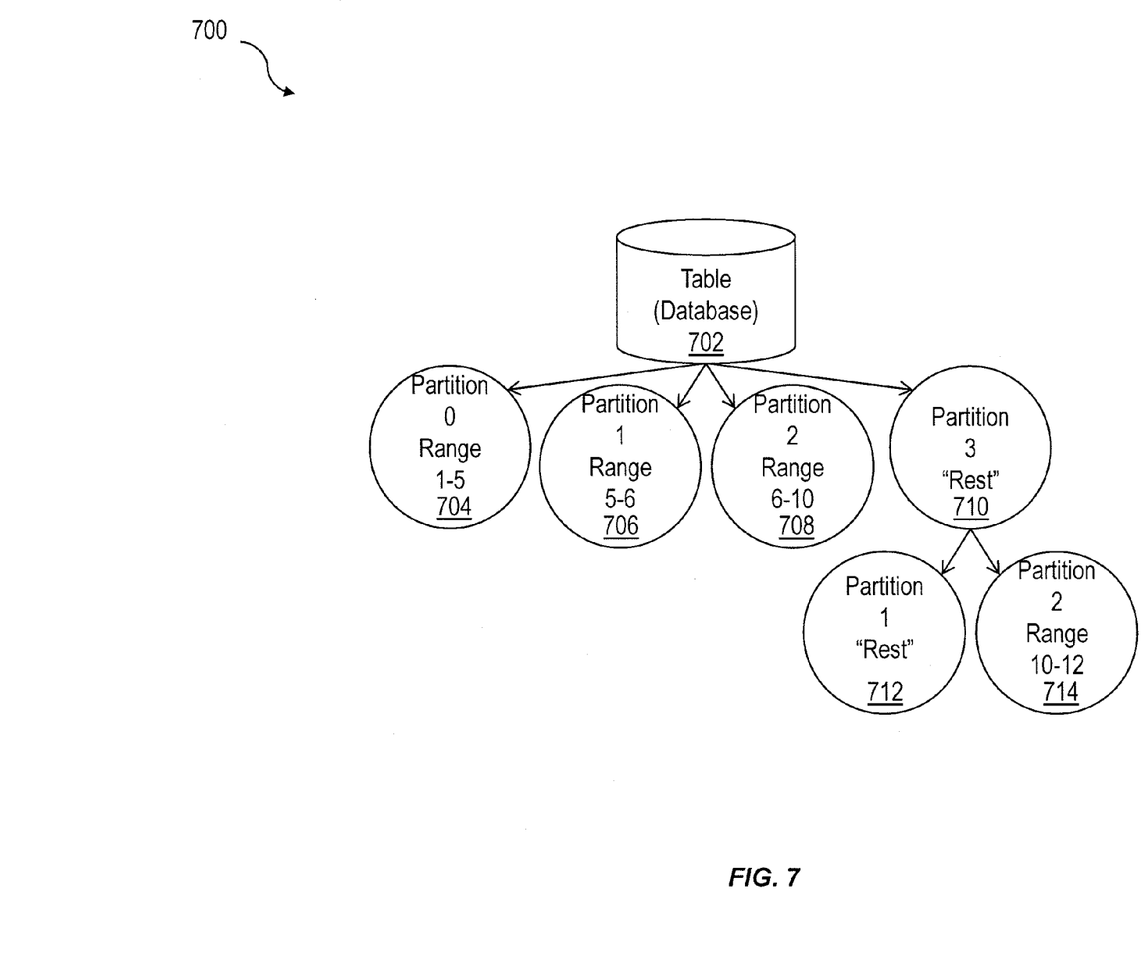
FIG. 7 is a diagram illustrating features of a rest partition and re-partition handling approach consistent with at least some implementations of the current subject matter.

Some implementations of the current subject matter can include one or more features relating to the use of a "rest" partition for handling of range partitioned data. As discussed above, range partitioning makes use values in one or more columns to assign data records to one of multiple partitions according to range criteria. Because it is possible that a record can include a value in the column(s) on which the range partitioning criteria are applied that is outside of the ranges assigned to existing partitions, a "rest" partition can be created for storage of "outside" values. As a simplified, illustrative example, the diagram 700 of FIG. 7 includes a table 702 that is split via range partitioning across a first range partition 704 assigned to a range of values between 1 and 4, a second range partition 706 assigned to a range of values between 5 and 6, and a third range partition 710 assigned to a range of values between 7 and 10. Records having a value exceeding 10 in the partitioning column can be stored in a rest partition 710. This avoids returning an error is a record includes an out of range value in the column(s) upon which the range partitioning criteria are applied. Eventually, if the rest partition 710 begins to receive frequent traffic, the rest partition 710 can be split to carve out a new range partition, for example a new rest partition 712 and a fourth range partition 714 assigned to a range of values between 10 and 12. In a multi-level partitioning approach as shown in FIG. 4 and discussed above, the rest partition re-partitioning can occur at each rest partition to maintain the symmetry of the partitioning tree.

Figure 8:
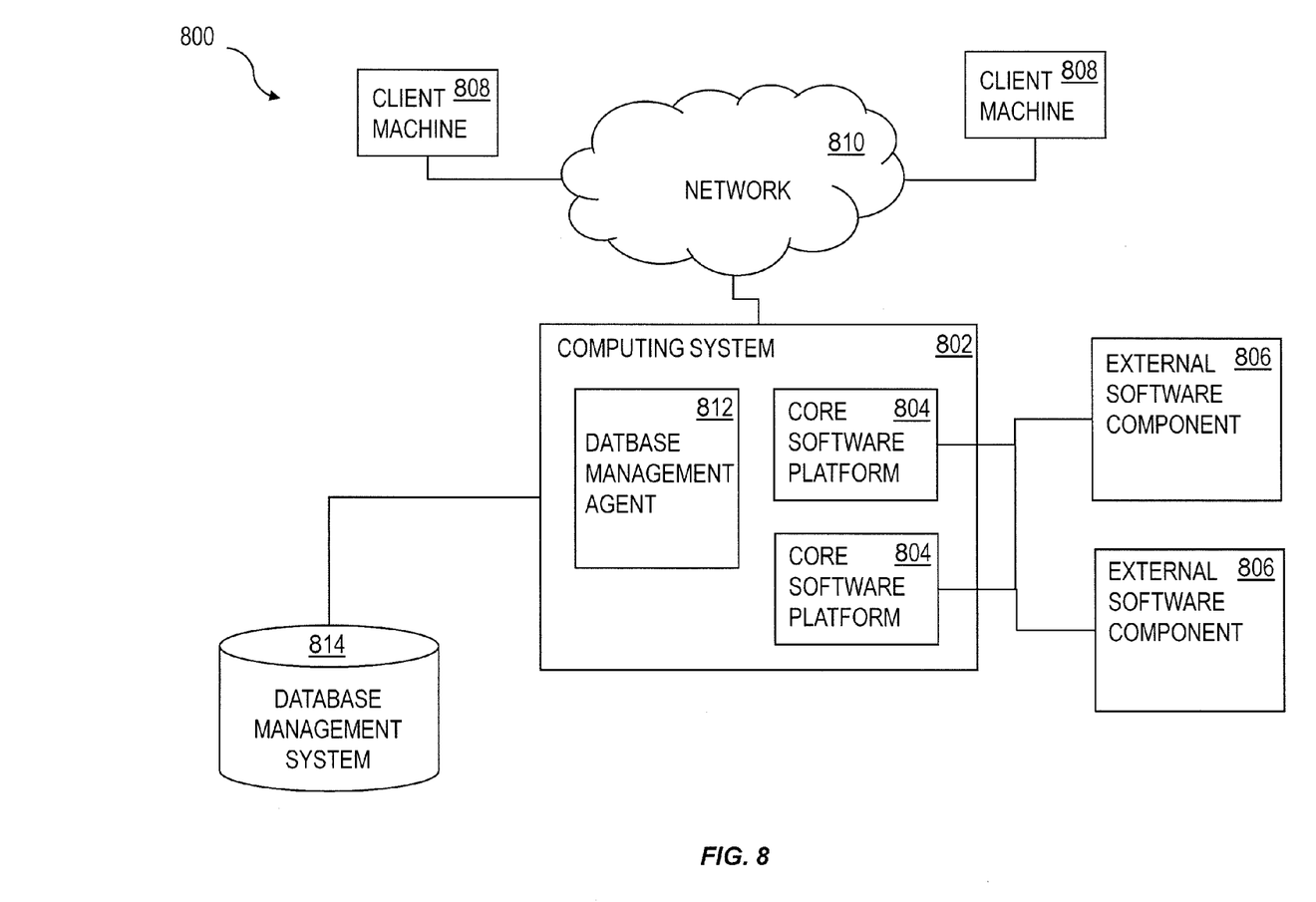
FIG. 8 is a diagram illustrating features of a business software system architecture consistent with at least some implementations of the current subject matter.

Consistent with some implementations of the current subject matter, the core software platform of an enterprise resource planning (ERP) system, other business software architecture, or other data-intensive computing application or software architecture can be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 8 shows a diagram of a system consistent with such an implementation. A computing system 802 can include one or more core software platform modules 804 providing one or more features of the business software system. The computing system can also aggregate or otherwise provide a gateway via which users can access functionality provided by one or more external software components 806. Client machines 808 can access the computing system, either via a direct connection, a local terminal, or over a network 810 (e.g. a local area network, a wide area network, a wireless network, the Internet, or the like).

A data management agent 812 or other comparable functionality can access a database management system 814 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 814 can include parallelization features consistent with those described herein.

Figure 9:
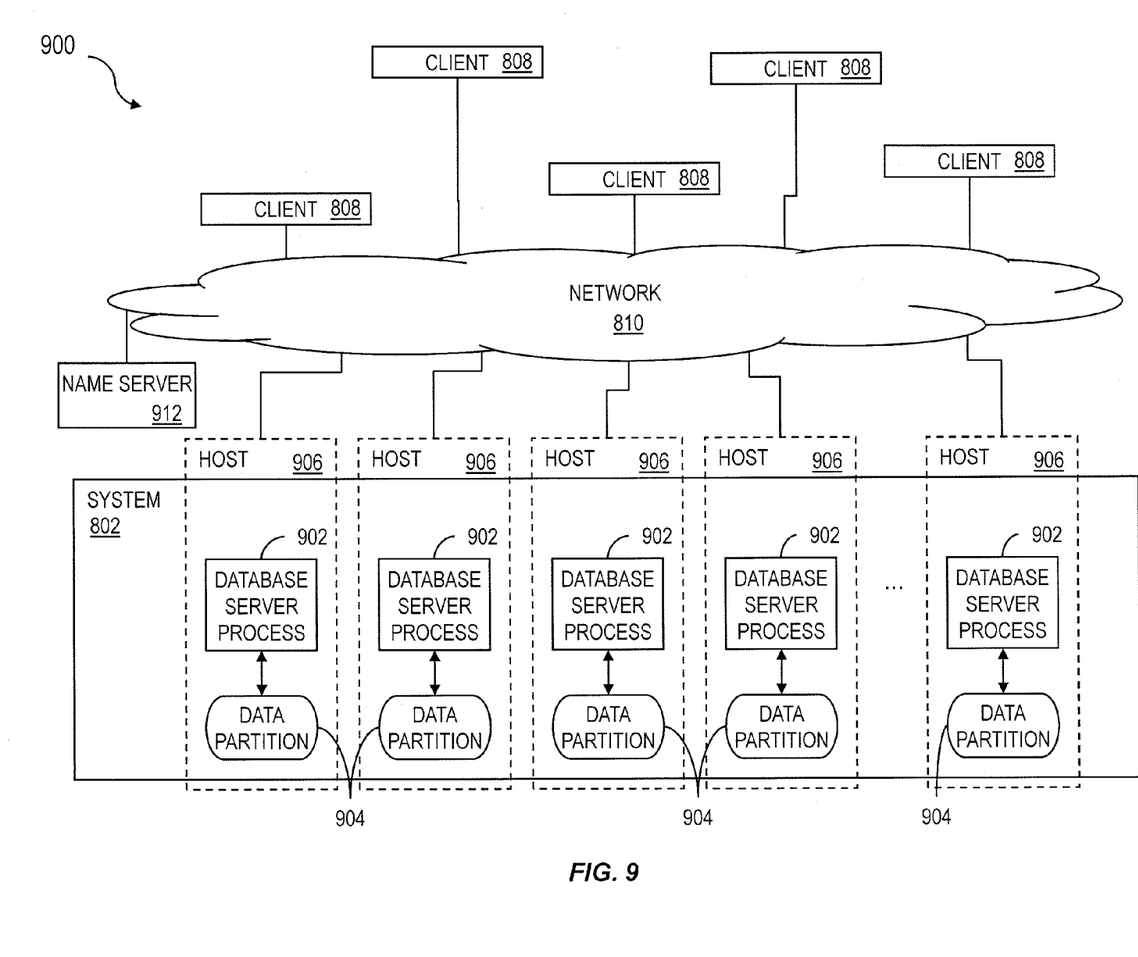
FIG. 9 is a diagram illustrating features of a database management system architecture consistent with at least some implementations of the current subject matter.

For data distribution purposes, tables or ranges within tables can be assigned to different database partitions that are assigned to different hosts, for example for scalability reasons. FIG. 9 shows an example of an enterprise resource system architecture 900 consistent with an implementation that includes data distribution for scalability reasons. Such a configuration can be used for large, on-premise or stand-alone systems with high performance requirements. Each data server process 902 and its associated data partition 904 can be assigned to a discrete host 906. A host 906 can be a standalone machine with one or more physical processors or a virtual machine on a larger system 802 as depicted in FIG. 9. A central component, labeled as a name server 912 in FIG. 9, knows the topology of the system and how data is distributed. In a system with data distribution, the name server knows which tables or partitions of tables are located on which data server process 902. One or more clients 914 (e.g. client machines 808) can access the name server 912, either via a direct connection or over a network 916.

In a data distribution scenario, the partitioning can be done table wise or also by splitting tables. With table wise partitioning, the name server assigns new tables to a database server process 902 based on the current distribution of tables (number of tables assigned to each database server process 902). Then data for this table will reside only on that database server process 902. It is also possible to specify that a table is split over multiple database server processes 902. The name server 912 can optionally partition the table based on a size estimation specified by the application. When records are inserted into a split table, the records can be distributed to other database server processes 902 based on name server information.

Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 10:
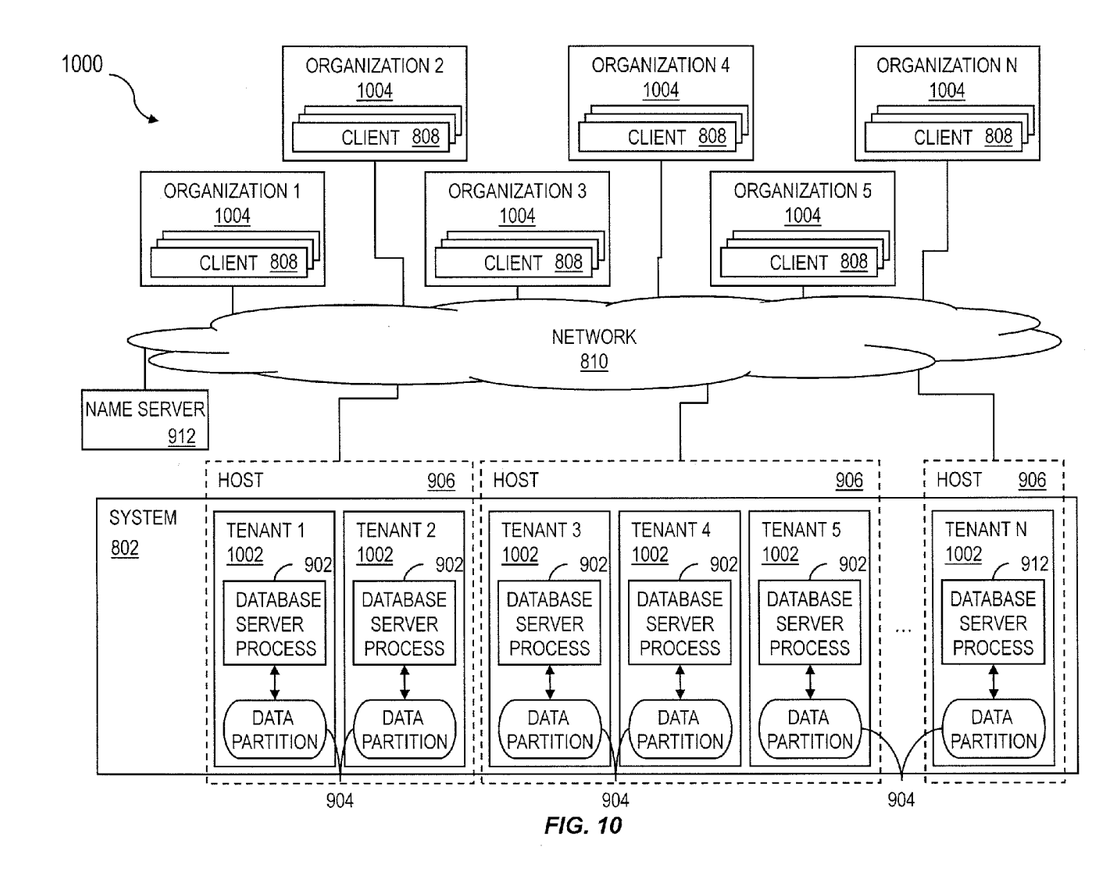
FIG. 10 is a diagram illustrating features of another database management system architecture consistent with at least some implementations of the current subject matter.

Data partitioning consistent with implementations of the current subject matter can also be used in a multi-tenancy environment as illustrated in the system architecture 1000 of FIG. 10. Multiple tenants 1002, each isolated from one another and available to be accessed by clients 914 within a separate organization 1004 of a plurality of organizations via a network 916, can be hosted by a same host 906, which can be a virtual machine on a larger system 802 as shown in FIG. 10 or a separate system that includes one or more physical processors. Tenants 1002 can also optionally be distributed across multiple database server processes 902 on more than one host 906. In this manner, tables or ranges within tables are assigned to different database server processes 902 that are assigned to different hosts 906 for scalability reasons. One or more tenants 1002 can alternatively be served by a single database server process 902 accessing a data partition 904 (or multiple data partitions 904) for the respective tenant 1002 that is isolated from other tenants 1002.

To provide for customization of the business process for each of multiple organizations supported by a single software delivery architecture, the data and data objects stored by a database management system can include three types of content: core software platform content (e.g. a standard definition of a business process), system content, and tenant content. Core software platform content includes content that represents core functionality and is not modifiable by a tenant. System content can in some examples be created by the runtime of the core software platform and can include core data objects that store concrete data associated with specific instances of a given business process and that are modifiable with data provided by each tenant. The data retained in these data objects are tenant-specific: for example, each tenant of the group of tenants can store information about its own inventory, sales order, etc. Tenant content for isolated to each tenant of the group of tenants includes data objects or extensions to other data objects that are customized for one specific tenant of the group of tenants to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content and system content and tenant content of a specific tenant of the group of tenants are accessed to provide the business process definition and/or the status information relating to a specific instance of the business process according to customizations and business data of that tenant such that each tenant of the group of tenants is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer program product storing instructions that, when executed by at least one programmable processor, cause the at least one programmable processor to perform operations comprising:
   receiving, by a recipient node of a multi-node data partitioning landscape comprising a plurality of processing nodes each comprising at least one data partition of a plurality of data partitions, a data request related to a table, the plurality of processing nodes comprising a master node controlling a plurality of slave nodes, the recipient node being a slave node, the data request bypassing the master node and being received directly from a requesting machine without being handled by the master node, wherein the table is partitioned into (i) at least two first level partitions at a first level that is based on a first partitioning method, and (ii) into two or more second-level partitions at a second level that is based on a second partitioning method that is the same for all of the at least two first level partitions;
   identifying, by the recipient node, a target node of the plurality of processing nodes to handle the data request, the target node being one of the slave nodes, the identifying comprising the recipient node (i) applying partitioning information to determine a target data partition of the plurality of data partitions to which the data request should be directed and (ii) mapping information associating each data partition of the plurality of data partitions with an assigned node of the plurality of processing nodes; and
   redirecting, by the recipient node, the data request to the target node so that the target node can act on the target data partition in response to the data request;
   wherein the data request comprises an update of a record already on the target data partition and wherein the operations further comprise:
       copying the record to a temporary partition on the target node;
       deleting the record from the target data partition;
       updating the record according to the data request to comprise an updated value;
       moving the updated record to a revised target partition based on the partitioning information applied to at least part of the updated value; and
       deleting the record from the temporary partition.

2. A computer program product as in claim 1, further comprising accessing the partitioning information and the mapping information from at least one of a local storage accessible to the recipient node and a metadata repository accessible to each of the plurality of processing nodes.

3. A computer program product as in claim 1, wherein the plurality of data partitions are part of a multi-node data partitioning landscape comprising data partitioning over at least two partitioning levels, the table being partitioned at a first level using a first partitioning specification and at a second level using a second partitioning specification.

4. A computer program product as in claim 1, wherein the operations further comprise:
   determining that at least one of the plurality of data partitions requires splitting;
   performing a split of each of the plurality of data partitions according to a partitioning specification to form a second plurality of second-level partitions; and
   updating the partitioning information and the mapping information for the recipient node and all other processing nodes of the plurality of processing nodes such that each processing node of the plurality of processing nodes is capable of acting as the recipient node.

5. A computer program product as in claim 1, wherein the plurality of data partitions are split according to range partitioning and the data request comprises a creation of a new record that does not fit within a range assigned to any of the plurality of data partitions, wherein the operations further comprise assigning a rest partition as the target data partition.

6. A system comprising:
   at least one programmable processor; and
   a machine-readable medium storing instructions that, when executed by the at least one programmable processor, cause the at least one programmable processor to perform operations comprising:

receiving, by a recipient node of a multi-node data partitioning landscape comprising a plurality of processing nodes each comprising at least one data partition of a plurality of data partitions, a data request related to a table, the plurality of processing nodes comprising a master node controlling a plurality of slave nodes in which the recipient node is a slave node, the data request being received directly from a requesting machine without being handled by a master node, wherein the table is partitioned into (i) at least two first level partitions at a first level that is based on a first partitioning method, and (ii) into two or more second-level partitions at a second level that is based on a second partitioning method that is the same for all of the at least two first level partitions;

identifying, by the recipient node, a target node of the plurality of processing nodes to handle the data request, the target node being one of the slave nodes, the identifying comprising the recipient node applying partitioning information to determine a target data partition of the plurality of data partitions to which the data request should be directed and mapping information associating each data partition of the plurality of data partitions with an assigned node of the plurality of processing nodes; and redirecting, by the recipient node, the data request to the target node so that the target node can act on the target data partition in response to the data request;

wherein the data request comprises an update of a record already on the target data partition and wherein the operations further comprise:

copying the record to a temporary partition on the target node;

deleting the record from the target data partition;

updating the record according to the data request to comprise an updated value;

moving the updated record to a revised target partition based on the partitioning information applied to at least part of the updated value; and deleting the record from the temporary partition.

7. A system as in claim 6, wherein the operations further comprise accessing the partitioning information and the mapping information from at least one of a local storage accessible to the recipient node and a metadata repository accessible to each of the plurality of processing nodes.

8. A system as in claim 6, wherein the operations further comprise:

determining that at least one of the plurality of data partitions requires splitting;

performing a split of each of the plurality of data partitions according to a partitioning specification to form a second plurality of second-level partitions; and updating the partitioning information and the mapping information for the recipient node and all other processing nodes of the plurality of processing nodes such that each processing node of the plurality of processing nodes is capable of acting as the recipient node.

9. A system as in claim 6, wherein the plurality of data partitions are split according to range partitioning and the data request comprises a creation of a new record that does not fit within a range assigned to any of the plurality of data partitions, wherein the operations further comprise assigning a rest partition as the target data partition.

10. A computer-implemented method comprising:

receiving, by a recipient node of a multi-node data partitioning landscape comprising a plurality of processing nodes each comprising at least one data partition of a plurality of data partitions, a data request related to a table, the plurality of processing nodes comprising a master node controlling a plurality of slave nodes, the recipient node being one of the slave nodes, the data request being received via a remote function call directly from a requesting machine without being handled by a master node, wherein the table is partitioned into (i) at least two first level partitions at a first level that is based on a first partitioning method, and (ii) into two or more second-level partitions at a second level that is based on a second partitioning method that is the same for all of the at least two first level partitions;

identifying, by the recipient node, a target node of the plurality of processing nodes to handle the data request, the target node being one of the slave nodes, the identifying comprising the recipient node applying partitioning information to determine a target data partition of the plurality of data partitions to which the data request should be directed and mapping information associating each data partition of the plurality of data partitions with an assigned node of the plurality of processing nodes, the identifying comprising a function performed by the master node; and redirecting, by the recipient node, the data request to the target node so that the target node can act on the target data partition in response to the data request;

wherein the data request comprises an update of a record already on the target data partition and wherein the operations further comprise:

copying the record to a temporary partition on the target node;

deleting the record from the target data partition;

updating the record according to the data request to comprise an updated value;

moving the updated record to a revised target partition based on the partitioning information applied to at least part of the updated value; and deleting the record from the temporary partition.

11. A computer-implemented method as in claim 10, further comprising accessing the partitioning information and the mapping information from at least one of a local storage accessible to the recipient node and a metadata repository accessible to each of the plurality of processing nodes.

12. A computer-implemented method as in claim 10, wherein the operations further comprise:

determining that at least one of the plurality of data partitions requires splitting;

performing a split of each of the plurality of data partitions according to a partitioning specification to form a second plurality of second-level partitions; and updating the partitioning information and the mapping information for the recipient node and all other processing nodes of the plurality of processing nodes such that each processing node of the plurality of processing nodes is capable of acting as the recipient node.

13. A computer-implemented method as in claim 10, wherein the plurality of data partitions are split according to range partitioning and the data request comprises a creation of a new record that does not fit within a range assigned to any of the plurality of data partitions, wherein the operations further comprise assigning a rest partition as the target data partition.

14. A computer-implemented method as in claim 10, wherein at least one of the receiving, the identifying, and the redirecting is performed by at least one programmable processor forming part of at least one computing system.

* * * * *